United States Patent
Inazawa et al.

(10) Patent No.: US 8,932,421 B2
(45) Date of Patent: Jan. 13, 2015

(54) METHOD OF MOLDING FIBER-REINFORCED PLASTIC HOLLOW PART

(75) Inventors: Koichi Inazawa, Miyoshi (JP); Natsuhiko Katahira, Toyota (JP); Fujio Hori, Anjo (JP)

(73) Assignees: Toyota Jidosha Kabushiki Kaisha, Aichi-ken (JP); Kabushiki Kaisha Toyota Jidoshokki, Aichi-ken (JP)

( * ) Notice: Subject to any disclaimer, the term of this patent is extended or adjusted under 35 U.S.C. 154(b) by 390 days.

(21) Appl. No.: 12/808,611

(22) PCT Filed: Dec. 17, 2008

(86) PCT No.: PCT/JP2008/072932
§ 371 (c)(1),
(2), (4) Date: Jun. 16, 2010

(87) PCT Pub. No.: WO2009/078419
PCT Pub. Date: Jun. 25, 2009

(65) Prior Publication Data
US 2010/0288425 A1 Nov. 18, 2010

(30) Foreign Application Priority Data
Dec. 17, 2007 (JP) .................................. 2007-324896

(51) Int. Cl.
*B29C 65/70* (2006.01)
*B29C 53/56* (2006.01)
(Continued)

(52) U.S. Cl.
CPC ............. *B29C 43/12* (2013.01); *B29C 43/3642* (2013.01); *B29C 70/446* (2013.01);
(Continued)

(58) Field of Classification Search
CPC ................. B29C 53/60; B29C 70/446; B29K 2105/0827

USPC ............. 156/156, 172, 287, 171, 245, 309.6, 156/148, 149
See application file for complete search history.

(56) References Cited

U.S. PATENT DOCUMENTS

| 4,624,460 A | 11/1986 | Murase et al. |
| 5,685,933 A | 11/1997 | Ohta et al. |

(Continued)

FOREIGN PATENT DOCUMENTS

| JP | 58-056823 A | 4/1983 |
| JP | 59-174169 A | 10/1984 |

(Continued)

OTHER PUBLICATIONS

International Search Report for PCT/JP2008/072932, dated Feb. 17, 2009, 2 pages.

(Continued)

*Primary Examiner* — John Goff
*Assistant Examiner* — Scott W Dodds
(74) *Attorney, Agent, or Firm* — Sughrue Mion, PLLC

(57) ABSTRACT

There is provided a method of molding a fiber-reinforced plastic hollow part that is capable of molding, with ease and at low costs, a fiber-reinforced plastic hollow part, which has a varying cross-section or a bent portion, in a state in which its weight is sufficiently reduced and in a state where its wall thickness is substantially uniform. A reinforcing fiber (21) and a matrix resin (24) are laminated on the outer circumference of a preformed hollow resin core (10) to obtain a hollow laminate (20). A pressurizing bag (30) is inserted and positioned inside that hollow resin core (10). The hollow laminate (20) is positioned inside a mold (40). Next, heat is applied while pressure is applied to the inside of the pressurizing bag (30) of the hollow laminate (20) positioned inside the mold, thereby integrating the resin and the reinforcing fiber.

2 Claims, 3 Drawing Sheets

(51) Int. Cl.
- *B29C 43/12* (2006.01)
- *B29C 43/36* (2006.01)
- *B29C 70/44* (2006.01)
- *B29K 105/06* (2006.01)
- *B29K 105/08* (2006.01)
- *B29K 105/00* (2006.01)
- *B29L 23/00* (2006.01)
- *B29L 31/30* (2006.01)

(52) U.S. Cl.
CPC ..... *B29C2043/3649* (2013.01); *B29K 2105/06* (2013.01); *B29K 2105/0854* (2013.01); *B29K 2105/256* (2013.01); *B29L 2023/00* (2013.01); *B29L 2031/30* (2013.01)
USPC ........... 156/156; 156/171; 156/172; 156/287; 156/245; 156/149

(56) References Cited

U.S. PATENT DOCUMENTS

| | | | | |
|---|---|---|---|---|
| 6,171,423 | B1 * | 1/2001 | Murphy et al. | 156/172 |
| 2002/0081415 | A1 | 6/2002 | Toi et al. | |
| 2004/0237760 | A1 * | 12/2004 | Shimizu | 87/34 |
| 2005/0077643 | A1 * | 4/2005 | Matsuoka | 264/103 |
| 2005/0121108 | A1 | 6/2005 | Hyysti | |
| 2005/0258575 | A1 * | 11/2005 | Kruse et al. | 264/512 |

FOREIGN PATENT DOCUMENTS

| | | |
|---|---|---|
| JP | 62-244620 | 10/1987 |
| JP | 02-072935 | 3/1990 |
| JP | 4-179515 A | 6/1992 |
| JP | 04-286612 | 10/1992 |
| JP | 07-174131 | 7/1995 |
| JP | 10-168699 A | 6/1998 |
| JP | 2002-187204 | 7/2002 |
| JP | 2002-187599 A | 7/2002 |
| JP | 2003-094448 A | 4/2003 |
| JP | 2003-328498 A | 11/2003 |
| JP | 2004-017412 A | 1/2004 |
| JP | 2005-153528 A | 6/2005 |
| JP | 2006-123475 A | 5/2006 |
| JP | 2006-130875 A | 5/2006 |
| JP | 2006-159457 A | 6/2006 |
| JP | 2006-305867 A | 11/2006 |
| JP | 2007-152718 A | 6/2007 |
| JP | 2007-260930 A | 10/2007 |

OTHER PUBLICATIONS

Non-Final Office Action dated Jan. 3, 2014, cited in U.S. Appl. No. 12/671,178, filed Jan. 28, 2010.

Notice of Allowance issued on Apr. 18, 2014, in U.S. Appl. No. 12/671,178, filed Jan. 28, 2010.

* cited by examiner

METHOD OF MOLDING FIBER-REINFORCED PLASTIC HOLLOW PART

TECHNICAL FIELD

The present invention relates to a method of molding a fiber-reinforced plastic hollow part by internal pressure molding.

BACKGROUND ART

Fiber-reinforced plastics (FRPs) are materials in which a matrix resin, such as a thermosetting resin or a thermoplastic resin, and a reinforcing fiber are integrated, and which are used in various fields for their light weight and superiority in terms of strength properties. Examples of the thermosetting resin that may be used include unsaturated polyester resins, epoxy resins, polyimide resins, and the like. Examples of the thermoplastic resin include polyethylene, polypropylene, polyamide, and the like. Examples of the reinforcing fiber may include carbon fibers, glass fibers, aramid fibers, and the like.

Hollow parts have been fabricated using fiber-reinforced plastics, and one of the molding methods thereof is internal pressure molding. Internal pressure molding is a method in which a hollow molding material is placed inside a cavity of a mold, internal pressure is applied from the inside of the hollow material to place the hollow material in close contact with the mold, and heat molding is performed under those conditions.

Patent Document 1 discloses an example in which a fiber-reinforced plastic hollow part with a varying cross-section is molded using internal pressure molding. In Patent Document 1, a prepreg is wound around a mandrel with a circular cross-section, and the mandrel is thereafter pulled out to produce a prepreg hollow part. A pressurizing bag is inserted into a hollow portion of the prepreg hollow part. The hollow part into which the pressurizing bag is inserted is placed inside a metal mold having a shape that accommodates the varying form of the hollow part, the metal mold having a filler prepreg disposed at the varied-form portion. By subsequently performing molding through internal pressure molding, an FRP hollow part with homogeneous cross-section variation is obtained.

Patent Document 2 discloses a structural member used in building constructions and a manufacturing method therefor. In Patent Document 2, there is produced a fabric in which a reinforcing fiber is, by braiding, wound around a hollow cylindrical liner (mold material) made of a stretchable material such as a thermoplastic resin or the like. After the fabric is placed inside a mold, a resin is impregnated into the reinforcing fiber and cured. During resin impregnation, pressurized air is supplied into the liner (mold material) to prevent the liner from being deformed.

Patent Document 1: JP Patent Publication (Kokai) No. 2006-123475 A

Patent Document 2: JP Patent Publication (Kokai) No. 2003-328498 A

DISCLOSURE OF INVENTION

Problems to be Solved by the Invention

In the method disclosed in Patent Document 1, a prepreg is wound around a mandrel (hollow core) with a circular cross-section, and the mandrel is thereafter pulled out to produce a hollow part comprising the prepreg, thus requiring a large amount of time to wind the prepreg around the mandrel so as to have the required wall thickness. In addition, the hollow part comprising the prepreg from which the mandrel has been pulled out is weak in terms of strength, and there is a possibility that local deformations, discrepancies in wall thickness, or wrinkles may occur during molding while applying pressure via a pressurizing bag. Further, since a mandrel with a circular cross-section is used, the hollow part comprising the prepreg is also of a substantially cylindrical form, and it is necessary to separately dispose prepregs inside the mold at locations that correspond to the varied-shape portions in order to produce a molded article having varied-shape portions. For this reason, with this internal pressure molding method, it is not possible to mold a molded article having a varying cross-section and a substantially uniform wall thickness. Further, since it presupposes the pulling out of the mandrel, it is difficult to mold with this method a fiber-reinforced plastic hollow part having a bent portion.

In the method disclosed in Patent Document 2, a reinforcing fiber is wound around a hollow cylindrical liner (mold material) by braiding to mold a fabric which is a hollow part. Though it is not mentioned in Patent Document 2, by using this method, a hollow fabric, whose cross-section is not circular or that has a bent portion, can be produced with relative ease. However, the internal pressure caused by the pressurized air during resin impregnation acts directly on the hollow cylindrical liner (mold material) around which the reinforcing fiber is wound. Therefore, in addition to its original function as a mandrel, the hollow cylindrical liner (mold material) must have sufficient thickness and mechanical strength so as to prevent occurrences of unwanted deformation due to localized concentrated stress that is caused by the impregnating resin or the imparted internal pressure. Thus, from the perspective of weight reduction, there remain problems to be improved.

The present invention is made in view of the circumstances above, and the problem addressed thereby is to provide a method of molding a fiber-reinforced plastic hollow part by internal pressure molding which, even in the case of a fiber-reinforced plastic hollow part having a varying cross-section or a bent portion, is capable of sufficient weight reduction and of molding in a state of substantially uniform wall thickness with ease and at low costs.

Means for Solving the Problems

The problem mentioned above is solved by, in a method of molding a fiber-reinforced plastic hollow part by internal pressure molding, producing a hollow laminate in which reinforcing fibers are laminated using a preformed hollow resin core, and removably inserting and positioning a pressurizing bag within the hollow resin core.

In other words, the first invention is a method of molding a fiber-reinforced plastic hollow part by internal pressure molding, the method comprising: a step of forming a hollow laminate by laminating a reinforcing fiber and a matrix resin on an outer circumference of a preformed hollow resin core; a step of inserting and positioning a pressurizing bag inside the hollow resin core of the hollow laminate; a step of positioning the hollow laminate inside a mold; a step of integrating the resin and the reinforcing fiber by applying heat while applying pressure inside the pressurizing bag of the hollow laminate positioned inside the mold; and a step of removing the pressurizing bag from an integrated molded article.

Further, the second invention is a method of molding a fiber-reinforced plastic hollow part by internal pressure molding, the method comprising: a step of forming a hollow laminate by laminating a reinforcing fiber on an outer circumference of a preformed hollow resin core; a step of inserting and positioning a pressurizing bag inside the hollow resin core of the hollow laminate; a step of positioning the hollow laminate inside a mold; a step of injecting a matrix resin into the mold; a step of integrating the resin and the reinforcing fiber by applying heat while applying pressure inside the pressurizing bag of the hollow laminate positioned inside the mold; and a step of removing the pressurizing bag from an integrated molded article.

In an internal pressure molding method of a fiber-reinforced plastic hollow part according to the present invention, by separating, as a hollow resin core and a pressurizing bag, a member for winding a reinforcing fiber around and a member on which the internal pressure applied during internal pressure molding acts directly, it is possible to make the hollow resin core function solely as a mandrel, thereby enabling reductions in wall thickness and weight. Further, since the pressurizing bag used in applying internal pressure is removed from the hollow part after molding, it is possible to obtain a fiber-reinforced plastic hollow part whose weight is sufficiently reduced.

In addition, since the hollow resin core is preformed in conformity with the shape of the fiber-reinforced plastic hollow part to be obtained, and the hollow resin core is left in the hollow laminate, it is possible to mold, with ease and at low costs, a fiber-reinforced plastic hollow part with a three-dimensionally varying cross-section having a substantially uniform wall thickness.

In a method of molding a fiber-reinforced plastic hollow part according to the present invention, there is no particular limitation on the method by which a reinforcing fiber is laminated on the outer circumference of a hollow resin core. However, for such reasons as the fact that a hollow part of any given shape can be obtained with ease, the fact that great strength against bending can be realized with a thinner wall thickness, and so forth, it is preferable that the step of laminating the reinforcing fiber on the outer circumference of the hollow resin core be performed by braiding. Further, a preferred embodiment is one where, during lamination by braiding, braiding yarn layers whose braiding angle relative to the axis is 0 degrees and braiding yarn layers whose braiding angle relative to the axis is θ degrees (excluding 0 degrees. Preferably 40 degrees to 70 degrees) are alternately laminated. In addition, with respect to the above-mentioned first invention, the laminating of the reinforcing fiber and the matrix resin in the step of forming the hollow laminate by laminating the reinforcing fiber and the matrix resin on the outer circumference of the preformed hollow resin core includes not only sequential lamination of a reinforcing fiber layer and a matrix resin layer, but also lamination of, on the outer circumference of the hollow resin core, a product in which a reinforcing fiber and a fibrous matrix resin are braided in the form of a fiber.

According to a method of molding a fiber-reinforced plastic hollow part by internal pressure molding according to the present invention, it is possible to mold, with ease and at low costs, a fiber-reinforced plastic hollow part, which has a varying cross-section or a bent portion, in a state in which its weight is sufficiently reduced and in a state where its wall thickness is substantially uniform.

DESCRIPTION OF SYMBOLS

10 . . . hollow resin core, 11 . . . open end of hollow resin core, 13 . . . bent portion, 14 . . . interior space of hollow resin core, 20,20A . . . hollow laminate, 21 . . . reinforcing fiber layer (braiding layer), 22 . . . braiding yarn layer whose braiding angle relative to the axis is 0 degrees, 23 . . . braiding yarn layer whose braiding angle relative to the axis is θ degrees (excluding 0 degrees), 24 . . . matrix resin film, 30 . . . pressurizing bag, 40,40A . . . mold, 41 . . . pressurizing air supply valve, P . . . vacuum pump, 42 . . . discharge port, 43 . . . resin inlet port, 44 . . . resin tank, 45 . . . matrix resin

BEST MODE FOR CARRYING OUT THE INVENTION

Figure 1:
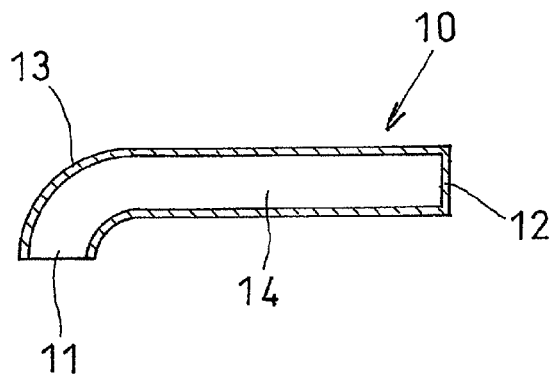
FIG. 1 is a sectional view showing an example of a preformed hollow resin core used in a method of the present invention.
Figure 2:
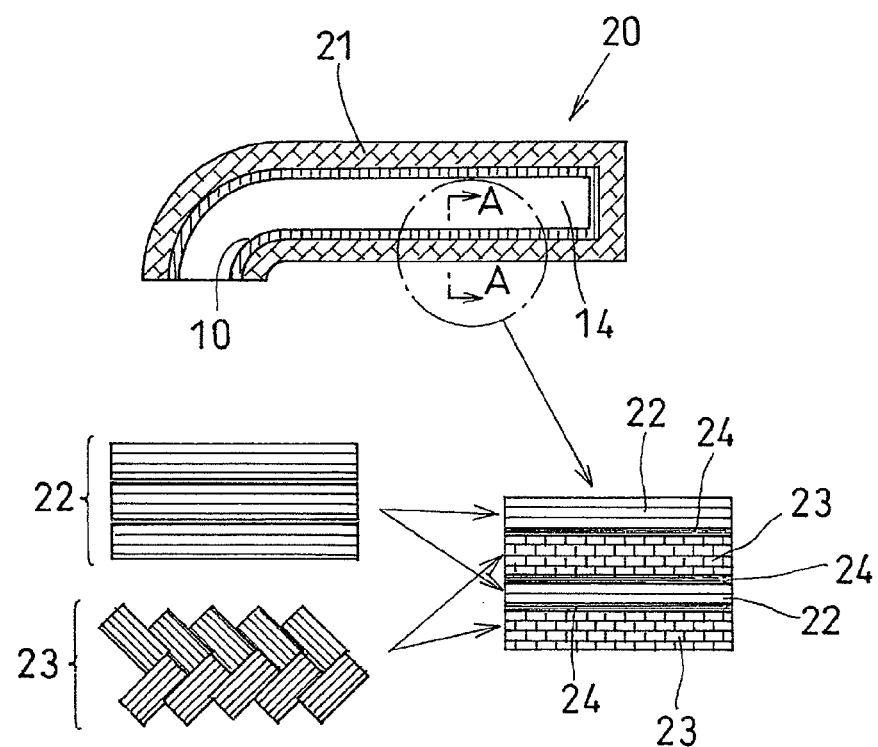
FIG. 2 is a diagram illustrating an example of a hollow laminate produced using the hollow resin core shown in FIG. 1.
Figure 3:
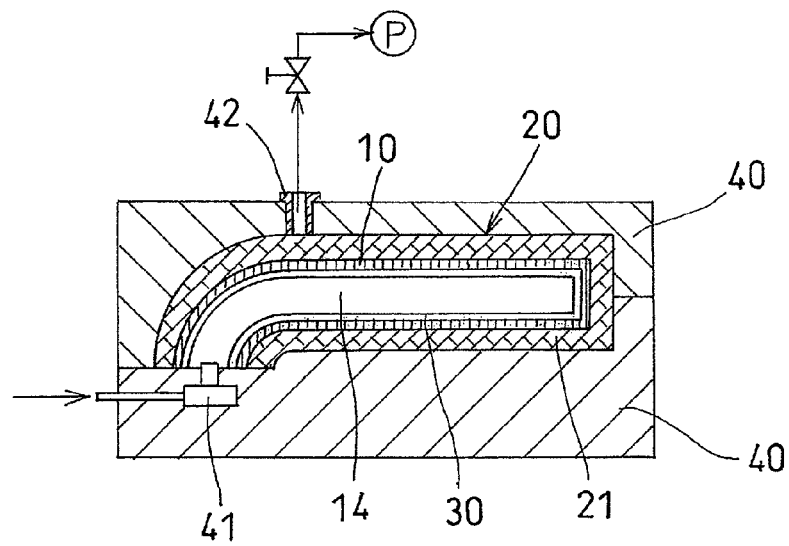
FIG. 3 is a diagram illustrating an example in which a fiber-reinforced plastic hollow part is molded by placing the hollow laminate shown in FIG. 2 inside a mold.
Figure 4:
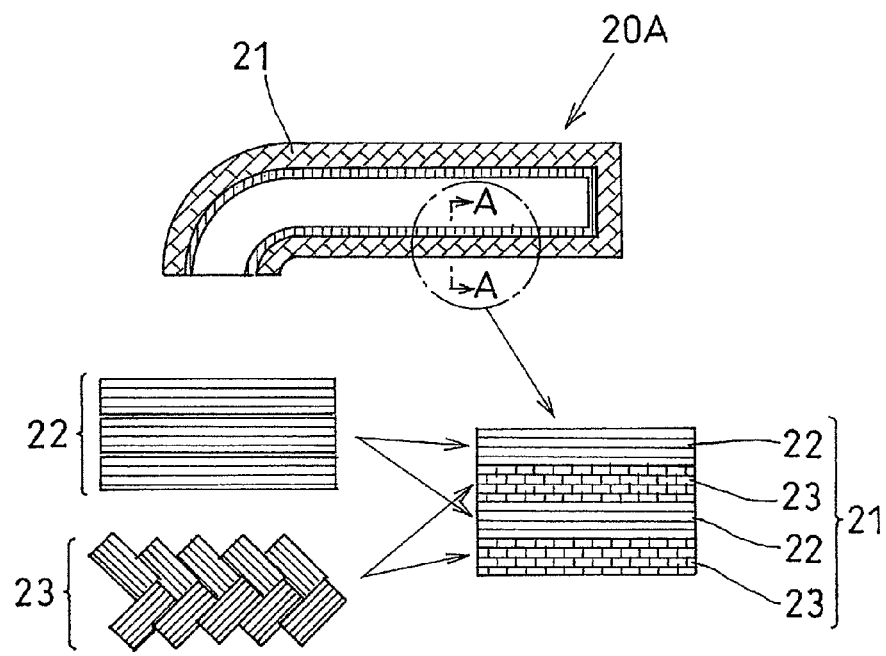
FIG. 4 is a diagram illustrating another example of a hollow laminate.
Figure 5:
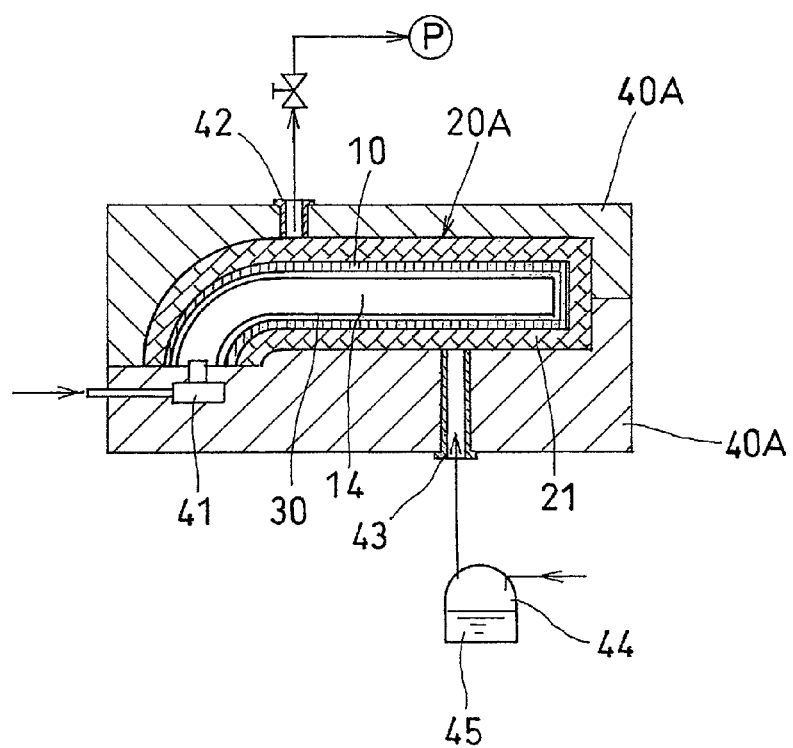
FIG. 5 is a diagram illustrating another example in which a fiber-reinforced plastic hollow part is molded by placing the hollow laminate shown in FIG. 4 inside a mold.

The present invention is described in further detail below based on descriptions of embodiments with reference to the drawings. FIG. 1 is a sectional view showing an example of a preformed hollow resin core used in a method of the present invention, FIG. 2 is a diagram illustrating an example of a hollow laminate produced using that, and FIG. 3 is a diagram illustrating an example in which a fiber-reinforced plastic hollow part is molded by placing that hollow laminate inside a mold. FIG. 4 is a diagram illustrating another example of a hollow laminate, and FIG. 5 is a diagram illustrating another example in which a fiber-reinforced plastic hollow part is molded by placing that hollow laminate inside a mold.

A hollow resin core 10 shown in FIG. 1 has such a shape that the side of one end 11 is open, the side of the other end 12 is closed, and there is a bent portion 13 in the middle. The interior is a space 14. The hollow resin core 10 is made of a thermoplastic resin such as an ABS resin, a PS resin, a PC resin, or the like. A resin material that will soften but not melt at the temperature reached during the molding of the later-described fiber-reinforced plastic hollow part should preferably used. The wall thickness may be about 1 mm. A two-piece article may be produced by vacuum molding or the like and then be adhered to form the shape shown in the diagram, or it may be molded in one piece by blow molding or the like.

The dimensions of the hollow resin core 10 should preferably be such that they are offset inward, by an amount corresponding to the wall thickness, from the external shape of the fiber-reinforced plastic hollow part to be molded. It is noted that "an amount corresponding to the wall thickness" as used above refers to the thickness of the fiber-reinforced plastic in the fiber-reinforced plastic hollow part.

A reinforcing fiber layer 21 is formed by laminating a reinforcing fiber on the outer circumference of the above-mentioned hollow resin core 10, thereby producing a hollow laminate 20 of a shape approximating the shape of the fiber-reinforced plastic hollow part to be obtained. Here, the reinforcing fiber may be a reinforcing fiber that is used in conventionally known fiber-reinforced plastics, and a carbon fiber may be suitably used, for example. The hollow resin core 10 maintains sufficient rigidity as a core (mandrel) during reinforcing fiber lamination performed at or below room temperature, and allows for easy lamination while controlling the wall thickness of the reinforcing fiber layer. Although any given method for laminating the reinforcing fiber on the outer circumference of the hollow resin core 10 may be selected, a conventionally known braiding method (cylindrical weaving) should preferably used to laminate while adjusting the weaving angle. In so doing, by making the braiding angle θ be small at the thin diameter portion of the hollow resin core 10 while making the braiding angle θ be large at the large diameter portion, thereby weaving while controlling the density of the weave, it is possible to form a braiding layer (reinforcing fiber layer) 21 without any gaps.

As shown in FIG. 2, in laminating the reinforcing fiber on the outer circumference of the hollow resin core 10, it is further preferable that braiding yarn layers 22, whose braiding angle relative to the axis is 0 degrees, and braiding yarn layers 23, whose braiding angle relative to the axis is θ degrees, be alternately laminated as shown in the A-A cross-section in FIG. 2. In this case, the θ-degree braiding angle of the braiding yarn layers 23 relative to the axis should preferably be within the range of 40 degrees to 70 degrees. While a four-layered reinforcing fiber layer 21 is shown in the figure, the number of layers is arbitrary, and an appropriate number of layers may be selected taking the demanded strength into consideration. By employing the reinforcing fiber layer 21 of such form, it is possible to improve and control the tensile strength in the longitudinal direction. As a result, it is possible to form a hollow laminate 20 having the same strength with a thinner reinforcing fiber layer 21, contributing to a reduction in weight as well. The time required for the process can also be shortened, and a step that takes 4 to 5 hours when the prepreg is laminated by hand can be reduced to 30 minutes or less.

In the example shown in FIG. 2, matrix resin films 24 are further laminated between the braiding yarn layers 22 and the braiding yarn layers 23. The matrix resin may be a thermosetting resin such as an unsaturated polyester resin, an epoxy resin, a polyimide resin, or the like, and it may also be a thermoplastic resin such as polyethylene, polypropylene, polyamide, or the like. It is selected as deemed appropriate, taking into consideration the purpose, the demanded property values, etc., of the fiber-reinforced plastic hollow part to be obtained. For example, if a pillar for use in automobiles is to be produced with a fiber-reinforced plastic hollow part, it is preferable that a thermosetting resin be used.

A pressurizing bag 30 is inserted and placed inside the interior space 14 of the hollow resin core 10 of the hollow laminate 20 that has been formed. The pressurizing bag 30 serves to transmit to the reinforcing fiber layer 21 via the hollow resin core 10 the pressure that is applied inside the pressurizing bag 30 during molding, and is made of an elastic material that can readily change its shape; for example, a material such as synthetic rubber, a polyamide-based resin film, or a urethane resin film. It is preferable that the shape of the pressurizing bag 30 match with the shape of the inner side of the hollow resin core 10. However, so long as it is of such a shape that it is able to come into close contact with the inner surface of the hollow resin core 10 by changing its shape due to the application of internal pressure, it may just be a shape that is similar to the shape of the inner side of the hollow resin core 10.

Next, as shown in FIG. 3, the hollow laminate 20 in which the pressurizing bag 30 is inserted in the interior space 14 of the hollow resin core 10 is placed inside the cavity of a mold 40 comprising a heater (not shown). The mold 40 comprises: a pressurizing air supply valve 41 at a location where the open end portion 11 of the hollow resin core 10 is positioned; and a discharge port 42 that connects the cavity space with a vacuum pump P.

After the mold 40 is closed, the vacuum pump P is operated to evacuate the interior of the cavity. As a result, the interior of the reinforcing fiber layer 21 of the hollow laminate 20 is deaerated. The heater is operated under these conditions, and raises the temperature to the melting temperature of the matrix resin film 24 disposed between the reinforcing fiber layers. The melted resin thus impregnates between the fibers. Around the time at which the resin melts and impregnation begins, the pressurizing air supply valve 41 is opened and pressurizing air is supplied to the pressurizing bag 30. The pressure may be about 0.1 MPa to 1 MPa, or it may be higher. Due to the supply of pressurizing air, the pressurizing bag 30 is subjected to internal pressure, and that pressure causes, via the softened hollow resin core 10, the reinforcing fiber layer 21 to bulge outward. As a result, the reinforcing fiber layer 21 is placed in a position where it is pressed against the inner surface of the cavity, and is thus shaped. This shaping is performed by means of the pressure that acts from the pressurizing bag 30 that is made with a material that is flexible and able to readily change its shape as mentioned above. Therefore, a substantially uniform pressure acts on all areas of the reinforcing fiber layer 21, and the wall thickness never becomes uneven even in areas comprising a varying cross-section.

If the matrix resin is a thermosetting resin, the temperature is raised further to the curing temperature and that temperature is maintained. As a result, the resin cures in such a manner as to form a matrix with the reinforcing fiber, thus becoming a fiber-reinforced plastic. After resin curing is completed, the internal pressure of the pressurizing bag 30 is removed, and the mold is opened after cooling. The fiber-reinforced plastic hollow part in which the resin has cured is taken out from the mold, and the pressurizing bag 30 is removed. Thus, a fiber-reinforced plastic hollow part according to the present invention which is made sufficiently lighter in weight is obtained.

FIG. 4 shows a hollow laminate 20A used in another embodiment of a method of molding a fiber-reinforced plastic hollow part according to the present invention. This hollow laminate 20A differs from the hollow laminate 20 shown in FIG. 2 only in that the matrix resin film 24 is not interposed between the fiber layers 22 and 23. Its structure may otherwise be the same, and like members are designated with like reference numerals while omitting descriptions thereof.

FIG. 5 illustrates a case where a fiber-reinforced plastic hollow part is molded by placing the hollow laminate 20A inside a mold 40A. Here, the mold 40A comprises a resin inlet port 43, and matrix resin 45 can be supplied from a resin tank 44 into the cavity via the port 43. Its configuration is otherwise the same as the mold 40 shown in FIG. 3, and like members are designated with like reference numerals while omitting descriptions thereof.

In performing molding, the hollow laminate 20A in which the pressuring bag 30 is inserted into the interior space 14 of the hollow resin core 10 is placed inside the cavity of the mold 40A. After the mold 40 is closed, the vacuum pump P is operated to evacuate the interior of the cavity. Further, the heater is operated under these conditions to raise the temperature to the melting temperature of the matrix resin 45, and the matrix resin 45 is supplied from the resin inlet port 43 into the cavity. The supplied matrix resin 45 impregnates between the fibers. Once a sufficient amount of resin is supplied, the resin inlet port 43 is closed.

Subsequent procedures such as opening the pressurizing air supply valve 41 around the time at which the supplying of resin begins, supplying pressurizing air to the pressurizing bag 30, and so forth, are the same as the molding procedures described based on the FIG. 3, and descriptions thereof are therefore omitted. With this method of molding, too, it is possible to obtain a fiber-reinforced plastic hollow part which has a substantially uniform overall wall thickness and which is made sufficiently lighter in weight.

As mentioned above, a method of molding according to the present invention is particularly suitable for use in producing a fiber-reinforced plastic hollow part of such a shape that it has a three-dimensionally varying cross-section and a bent portion. However, it is by no means limited thereto, and it naturally may also be used in producing a fiber-reinforced plastic hollow part of a simple cross-section such as a circular cross-section, or a linear fiber-reinforced plastic hollow part.

The invention claimed is:

1. A method of molding a fiber-reinforced plastic hollow part by internal pressure molding, the method comprising:
   a step of forming a hollow laminate by laminating a reinforcing fiber and a matrix resin on an outer circumference of a hollow resin core preformed from a thermoplastic resin;
   a step of inserting and positioning a pressurizing bag inside the hollow resin core of the hollow laminate; a step of positioning the hollow laminate inside a mold;
   a step of integrating the resin and the reinforcing fiber by applying heat while applying pressure inside the pressurizing bag of the hollow laminate positioned within the mold; and
   a step of removing the pressurizing bag from an integrated molded article,
   wherein the step of laminating the reinforcing fiber on the outer circumference of the hollow resin core is performed by alternately laminating, by braiding, a braiding yarn layer whose braiding angle relative to a longitudinal axis of the hollow resin core is 0 degrees and a braiding yarn layer whose braiding angle relative to the longitudinal axis of the hollow resin core is θ degrees (excluding 0 degrees), and laminating a matrix resin film between the braiding yarn layer whose braiding angle relative to the axis is 0 degrees and the braiding yarn layer whose braiding angle relative to the axis is θ degrees.

2. The method of molding a fiber-reinforced plastic hollow part according to claim 1, wherein θ is about 40 to 70 degrees.

\* \* \* \* \*